United States Patent
Zhang et al.

(10) Patent No.: US 7,100,018 B2
(45) Date of Patent: Aug. 29, 2006

(54) SYSTEM AND METHOD FOR ENCODING PAGE SIZE INFORMATION

(75) Inventors: David Zhang, San Jose, CA (US); Mahdi Seddighnezhad, San Carlos, CA (US)

(73) Assignee: Silicon Graphics, Inc., Mountain View, CA (US)

(*) Notice: Subject to any disclaimer, the term of this patent is extended or adjusted under 35 U.S.C. 154(b) by 336 days.

(21) Appl. No.: 10/632,681

(22) Filed: Jul. 31, 2003

(65) Prior Publication Data
US 2005/0027962 A1    Feb. 3, 2005

(51) Int. Cl.
*G06F 12/04* (2006.01)
(52) U.S. Cl. .................. 711/207; 711/203; 711/205; 711/206
(58) Field of Classification Search ............ None
See application file for complete search history.

(56) References Cited

U.S. PATENT DOCUMENTS

| | | | |
|---|---|---|---|
| 5,465,337 A * | 11/1995 | Kong | 711/207 |
| 5,946,716 A * | 8/1999 | Karp et al. | 711/207 |
| 6,047,354 A * | 4/2000 | Yoshioka et al. | 711/118 |
| 6,446,187 B1* | 9/2002 | Riedlinger et al. | 711/206 |
| 6,549,997 B1* | 4/2003 | Kalyanasundharam | 711/207 |
| 6,625,715 B1* | 9/2003 | Mathews | 711/207 |

* cited by examiner

*Primary Examiner*—Reginald G. Bragdon
*Assistant Examiner*—Daniel Ko
(74) *Attorney, Agent, or Firm*—Schwegman, Lundberg, Woessner & Kluth, P.A.

(57) ABSTRACT

A system and method for encoding page size information has been described herein. In one embodiment, the method includes determining whether a virtual address is stored in a translation lookaside buffer (TLB), the TLB including a plurality of entries, wherein the entries include a minimum virtual page number bit string and a variable bit string. In one embodiment the method also includes determining whether the first bit string matches the minimum virtual page number bit string of one of the entries. In one embodiment, if the first bit string matches the minimum virtual page number bit string of one of the entries, the method includes decoding a page size stored in the variable portion of the matching entry and a 1-bit field associated with the matching entry, wherein the decoding determines a set of bits of the variable bit string.

20 Claims, 8 Drawing Sheets

SYSTEM AND METHOD FOR ENCODING PAGE SIZE INFORMATION

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to the field of virtual addressing and particularly to resolving virtual addresses using page size information.

BACKGROUND

Typically, computers systems provide an address space that is much larger than the physical memory contained within the computer system. This larger address space is often referred to as virtual memory or virtual address space. The virtual address space is often divided into blocks called pages. For pages to be quickly accessible by application and system software, the pages must be loaded into the computer's physical memory. When pages are loaded into physical memory, they are mapped from the virtual address space into the physical address space (e.g. the address space available in random access memory and cache). Such address mapping is referred to as virtual address resolution. Often, the mapping information for a set of virtual memory addresses is stored in a fast memory called a translation lookaside buffer (TLB). Thus, TLBs facilitate quick mapping of virtual addresses to physical addresses.

Many computer systems allow different software programs to use different page sizes. For example, one software application may use a 16 Kb page size, while another software application uses a 4 Kb page size. Providing support for variable page sizes allows software to use physical memory more efficiently. For example, when software applications use page sizes that are too big, address space is wasted. Moreover, when software applications use page sizes that are too small, the TLB is very large; thus requiring a large area to accommodate the TLB. Therefore, for computer systems that support variable page sizes, there is a need for TLBs that efficiently store address mapping information for multiple page sizes.

BRIEF DESCRIPTION OF THE FIGURES

The present invention is illustrated by way of example and not limitation in the Figures of the accompanying drawings, in which like references indicate similar elements and in which.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment," "an embodiment," or "an alternative embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

This description of the embodiments is divided into three sections. In the first section, an exemplary hardware and operating environment is described. In the second section, a system level overview is presented. In the third section, an exemplary implementation is described.

Hardware and Operating Environment

This section provides an overview of the exemplary hardware and the operating environment in which embodiments of the invention can be practiced.

Figure 1:
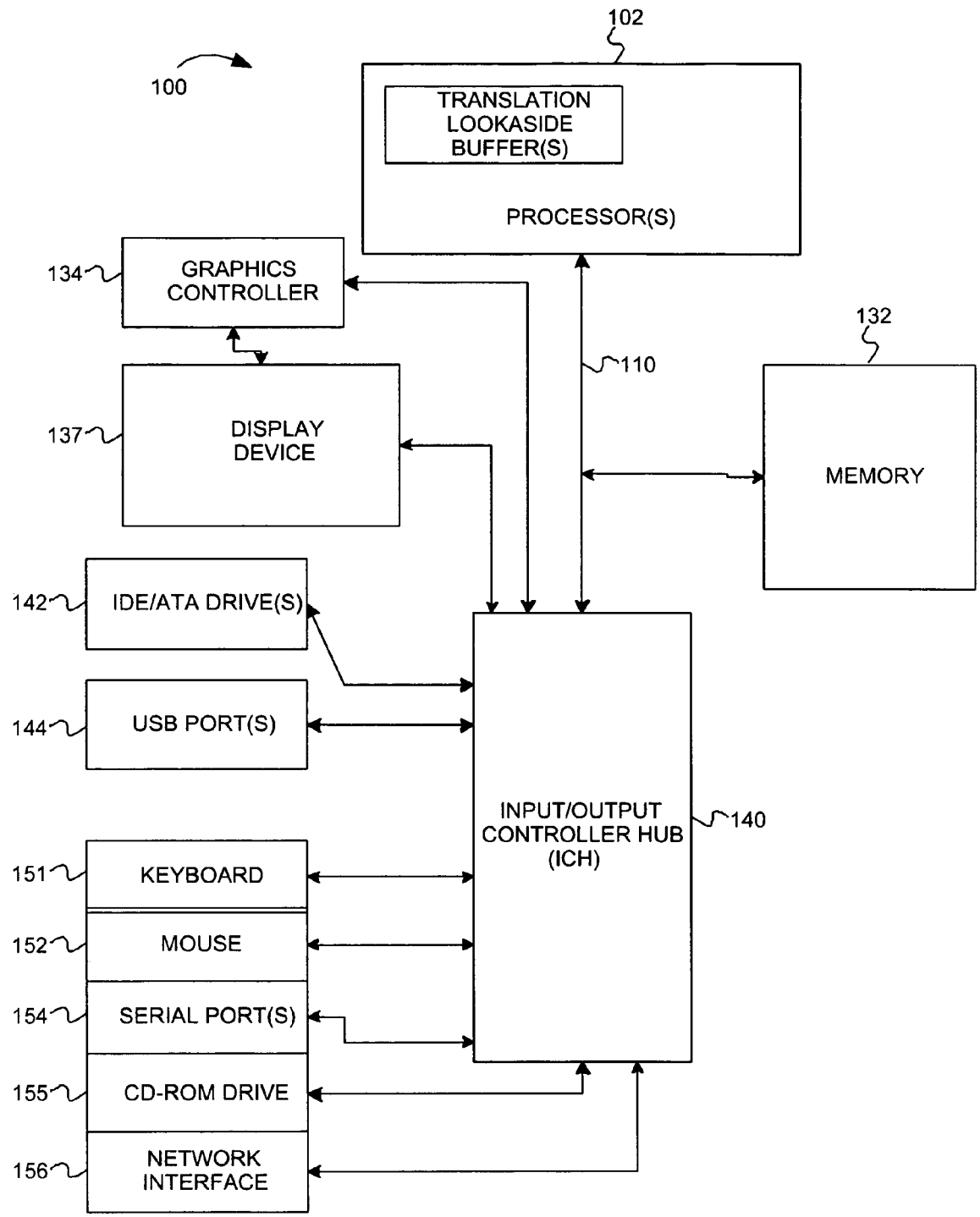
FIG. 1 illustrates an exemplary computer system used in conjunction with certain embodiments of the invention.

FIG. 1 illustrates an exemplary computer system used in conjunction with certain embodiments of the invention. As illustrated in FIG. 1, computer system 100 comprises processor(s) 102, which includes a translation lookaside buffer(s) (TLB). Computer system 100 also includes a memory 132, processor bus 110, and input/output controller hub (ICH) 140. The processor(s) 102, memory 132, and ICH 140 are coupled to the processor bus 110. The processor(s) 102 may comprise any suitable processor architecture. The computer system 100 may comprise one, two, three, or more processors, any of which may execute a set of instructions in accordance with embodiments of the present invention.

The memory 132 stores data and/or instructions, and may comprise any suitable memory, such as a dynamic random access memory (DRAM), for example. The computer system 100 also includes IDE drive(s) 142 and/or other suitable storage devices. A graphics controller 134 controls the display of information on a display device 137, according to embodiments of the invention.

The input/output controller hub (ICH) 140 provides an interface to I/O devices or peripheral components for the computer system 100. The ICH 140 may comprise any suitable interface controller to provide for any suitable communication link to the processor(s) 102, memory 132 and/or to any suitable device or component in communication with the ICH 140. For one embodiment of the invention, the ICH 140 provides suitable arbitration and buffering for each interface.

For one embodiment of the invention, the ICH 140 provides an interface to one or more suitable integrated drive electronics (IDE) drives 142, such as a hard disk drive (HDD) or compact disc read only memory (CD ROM) drive, or to suitable universal serial bus (USB) devices through one or more USB ports 144. For one embodiment, the ICH 140 also provides an interface to a keyboard 151, a mouse 152, a CD-ROM drive 155, and one or more suitable devices through one or more serial ports 154. For one embodiment of the invention, the ICH 140 also provides a network interface 156 though which the computer system 100 can communicate with other computers and/or devices.

In one embodiment, the computer system 100 includes a machine-readable medium that stores a set of instructions (e.g., software) embodying any one, or all, of the methodologies described herein. Furthermore, software can reside, completely or at least partially, within memory 132 and/or within the processor(s) 102.

System Level Overview

Figure 2:
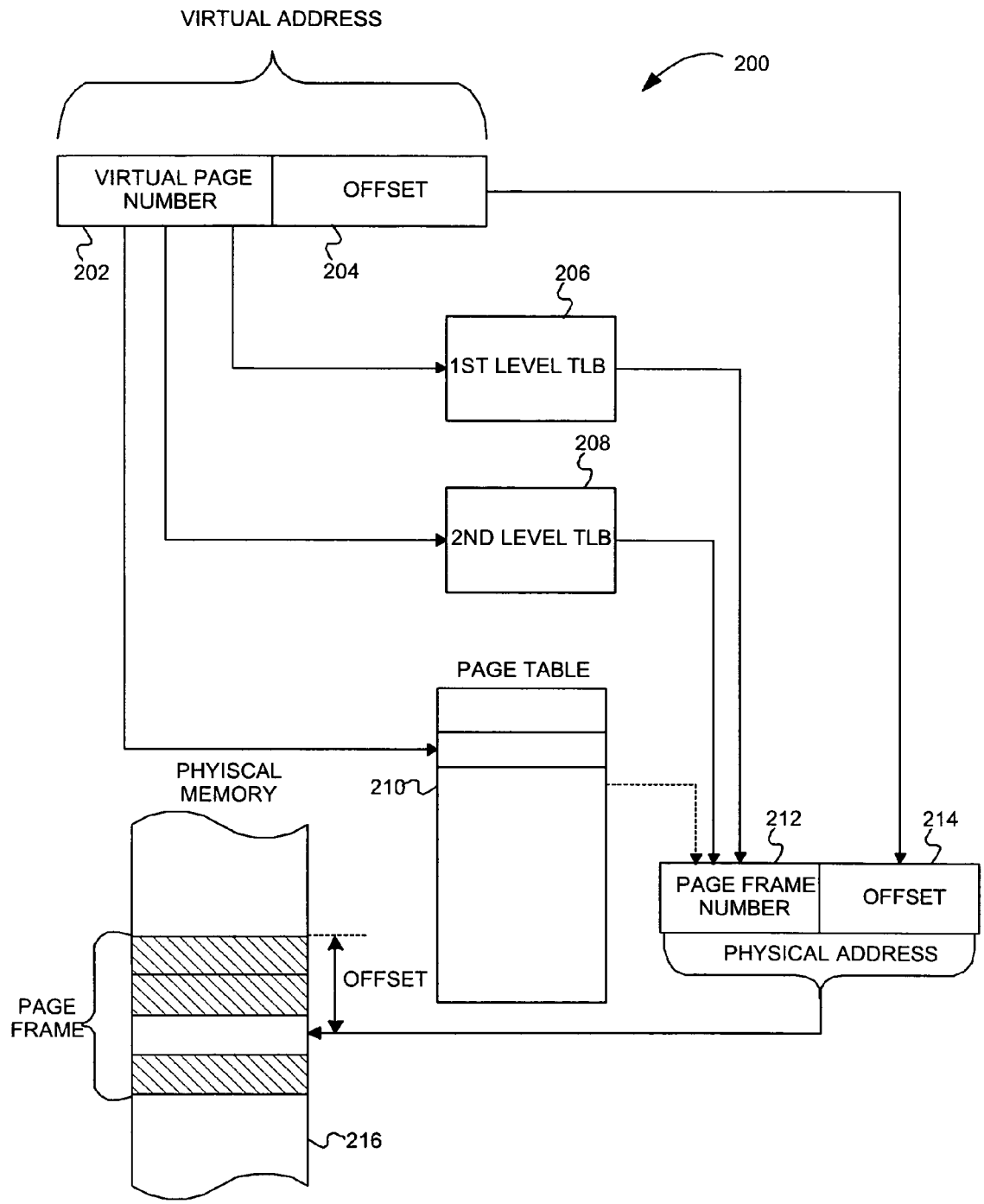
FIG. 2 is a block diagram illustrating a system for resolving virtual addresses, according to embodiments of the invention.
Figure 3:
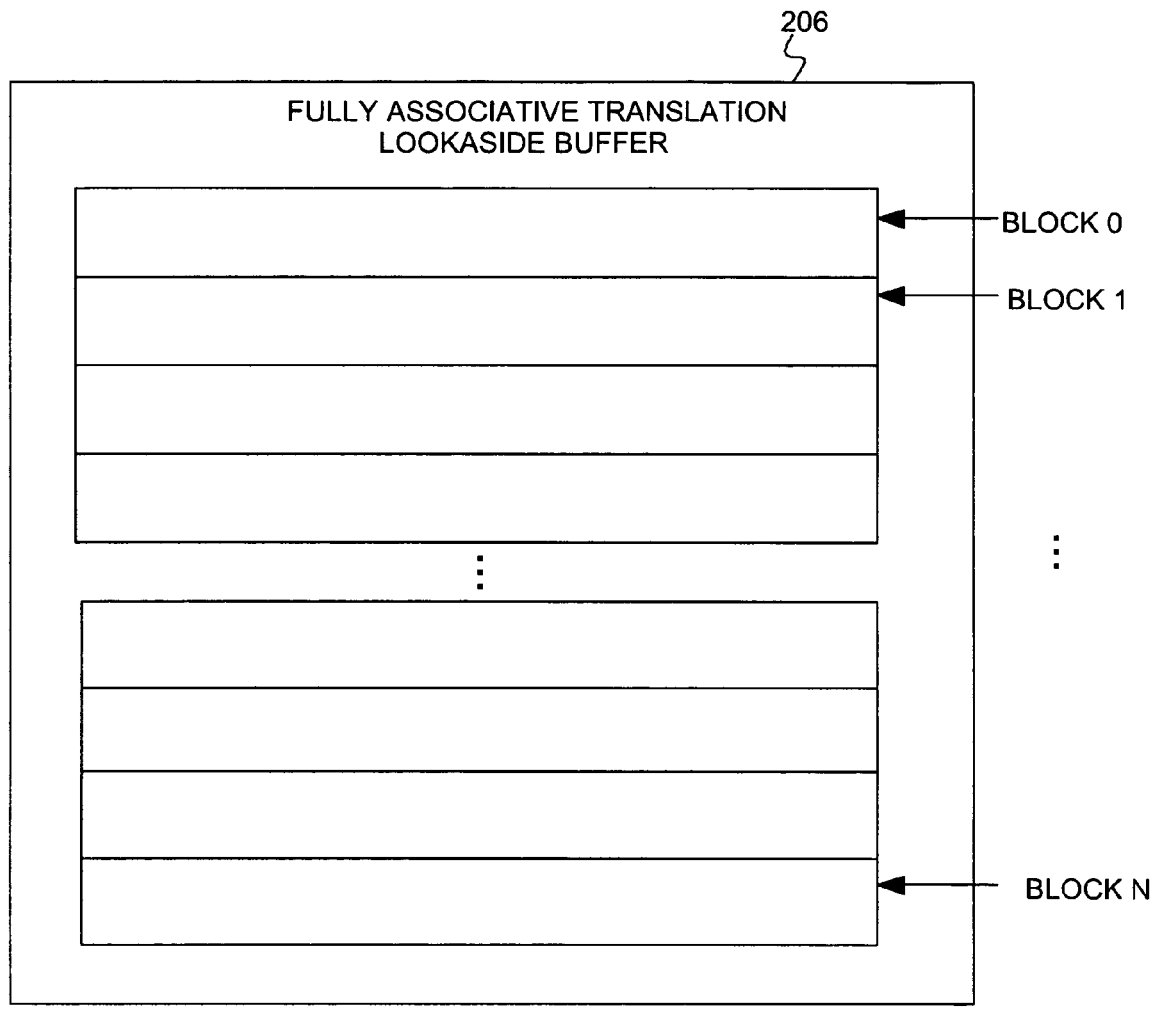
FIG. 3 is a block diagram illustrating a fully associative translation lookaside buffer, used in conjunction with embodiments of embodiments of the invention.

This section provides a system level overview of exemplary embodiments of the invention. FIGS. 2–3 describe an architecture and data flow between processor units of a virtual memory system. In particular, FIG. 2 describes resolving virtual memory addresses, while FIG. 3 describes a translation lookaside buffer.

FIG. 2 is a block diagram illustrating a system for resolving virtual addresses, according to embodiments of the invention. As shown in FIG. 2, the virtual address resolution system 200 includes a first level TLB 206, a second level TLB 208, a page table 210, and a physical memory 216. As shown in FIG. 2, a virtual address includes a virtual page number 202 and an offset 204. The virtual page number 202 is transmitted to the first level TLB 206, which attempts to match the virtual page number 202 with a virtual page number (not shown) stored in the first level TLB 206. If the first level TLB 206 finds an entry containing a virtual page number matching the virtual page number 202, the first level TLB 206 provides a page frame number 212 corresponding to the virtual page number 202. The virtual page number 202 is also transmitted to a second level TLB 208, which attempts to match the virtual page number 202 with a virtual page number (not shown) stored in the second level TLB 208. If the second level TLB 208 finds an entry containing a virtual page number matching the virtual page number 202, the second level TLB 208 provides the page frame 212 number corresponding to the virtual page 202.

Although not shown in FIG. 2, the first level TLB 206 includes faster matching logic than the second level TLB 208, which includes faster logic than the page table 210. Some of the matching operations can be performed simultaneously to minimize delays associated with resolving virtual addresses. That is, operations for fetching the physical address information from the first level TLB 206 and second level TLB 208 can be performed in simultaneously with to minimize latency associated virtual address resolution. In one embodiment, the first level TLB 206 is a fully associative TLB and the second level TLB 208 is a set associative TLB. In one embodiment, both the first and second level TLBs are set associative TLBs. In one embodiment, if a match is not found in either of the TLBs, the virtual address resolution system 200 fetches the corresponding page frame number 212 from the page table 210 and loads it into one or both of the TLBs (see discussion of TLB exceptions in the next section).

Once the page frame number 212 is fetched from either of the TLBs or from the page table 210, it is combined with the offset 214 to the form a physical address. As shown in FIG. 2, the page frame number 212 is used to address a page in the physical memory 216. The offset 214 is used to access and address relative to the beginning of the page.

FIG. 3 is a block diagram illustrating a fully associative translation lookaside buffer, according to embodiments of the invention. As shown in FIG. 3, the fully associative translation lookaside buffer 206 includes blocks 0 through N. Each block includes a TLB entry, which stores virtual address information including a page frame number 212, as described above. In one embodiment, the TLB entries also include read permissions fields, a write permissions fields, and valid fields. In one embodiment, the TLB entry includes a use field and a dirty field. According to alternative embodiments, the TLB entry includes other suitable fields for mapping virtual addresses into the physical address space.

Exemplary Implementation

Figure 4A:
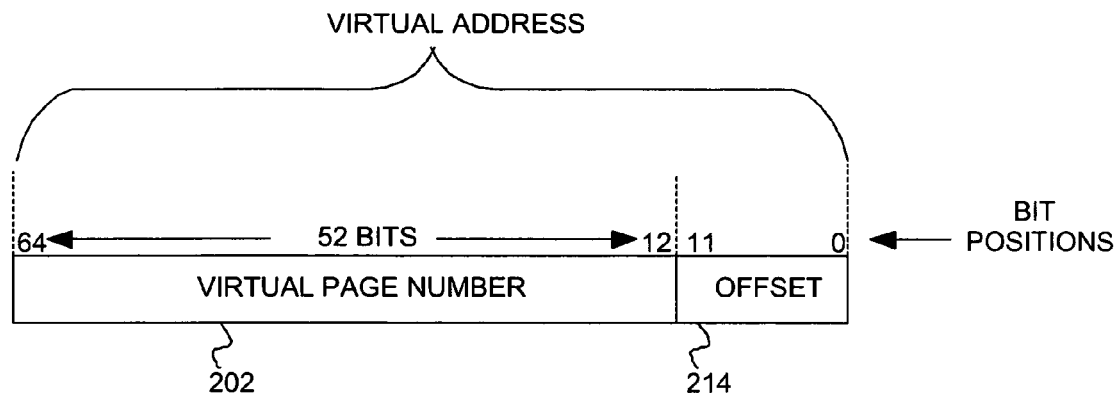
FIG. 4A is a block diagram illustrating the fields of a virtual address, used in conjunction with embodiments of the invention.

FIG. 4A is a block diagram illustrating the fields of a virtual address, used in conjunction with embodiments of the invention. As shown in FIG. 4A, a virtual address includes two data fields: 1) an offset 214 and 2) a virtual page number 202. As shown in FIG. 4A, the virtual address is represented in 64 bits. The offset 214 is represented in 12 bits, which occupy bit positions 0 through 11 of the 64-bit virtual address. Thus, the 12-bit offset 214 can address $2^{12}=4$ Kb different locations within a page. The virtual page number 202 is represented in 52 bits. The virtual page number 202 occupies bit positions 12 through 64 of the 64-bit virtual address. As described above with reference to FIG. 2, the virtual page number 202 is used to find a page in physical memory, while the offset 214 is used to address a location within the page.

Figure 4B:
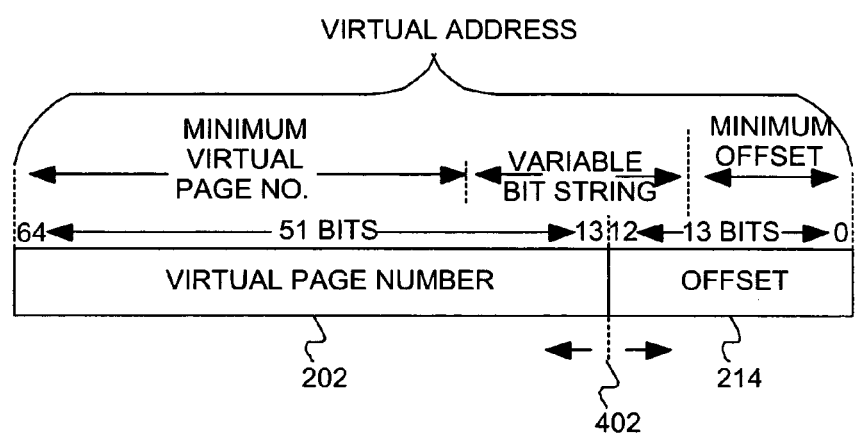
FIG. 4B is a block diagram illustrating a virtual address including a variable offset field size, according to embodiments of the invention.

FIG. 4B is a block diagram illustrating a virtual address including a variable offset field size, according to embodiments of the invention. The size of the offset field is related to the page size. In one embodiment, the size of the offset field (i.e. the number of bits in the offset 214) is determined as follows:

Offset Field Size=$\log_2$ (Page Size). For example, when the page size is 4 Kb, the offset field size is $\log_2$ (4 Kb)=12 bits. As another example, when the page size is 8 Kb, the offset field size is $\log_2$ (8 Kb)=13 bits.

The processor(s) 102 supports variable page sizes. That is, the processor(s) 102 allows different processes to use different page sizes. For example, one process can use a 4 Kb page size, while another process uses a 16 Kb page size. When supporting variable page sizes, the offset boundary 402 varies based on the page size of the process resolving the virtual address. As shown in FIG. 4B, the offset boundary 402 lies between bits 12 and 13 of the virtual address, creating a 13-bit offset 214 and 51-bit virtual page number 204. However, the offset boundary 402 can move left (increasing the offset field size) or right (decreasing the offset field size), depending on the current page size. For example, when the page size is 16 Kb, the virtual page number field size is 50 bits and the offset field size is 14 bits. As such, the boundary 402 lies between bits 13 and 14. As another example, when the page size is 16 Kb, the virtual page number field size is 49 bits and the offset field size is 15 bits. As such, the boundary 402 lies between bits 14 and 15.

As shown in FIG. 4B, because the offset size can vary, the virtual address can be divided into a minimum offset, variable bit string, and minimum virtual page number. The offset 214 is guaranteed to be at least as large as the minimum offset (i.e., the offset is guaranteed to be as large as the smallest supported page size). Similarly, the virtual page number 202 is guaranteed to be at least as large as the minimum virtual page number. The variable bit string represents the virtual address portion that could be part of the offset 214 or part of the virtual page number 202, depending on the page size. In one embodiment, the boundary 402 can move to support any number of page sizes that can be represented in a 64-bit virtual address. In an alternative embodiment, the boundary can move to support any number of page sizes that can be represented in a larger or smaller virtual address.

Figure 5A:
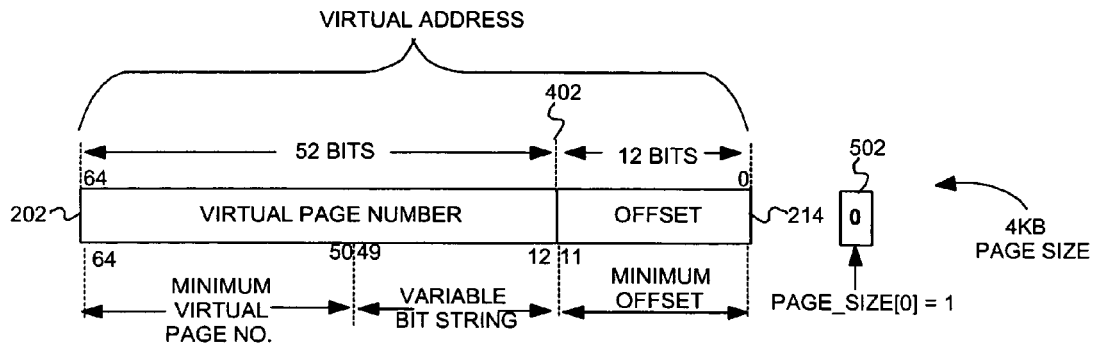
FIG. 5A is a block diagram illustrating virtual memory address fields and a 1-bit bit vector for encoding a page size within a virtual address, according to embodiments of the invention.
Figure 5B:
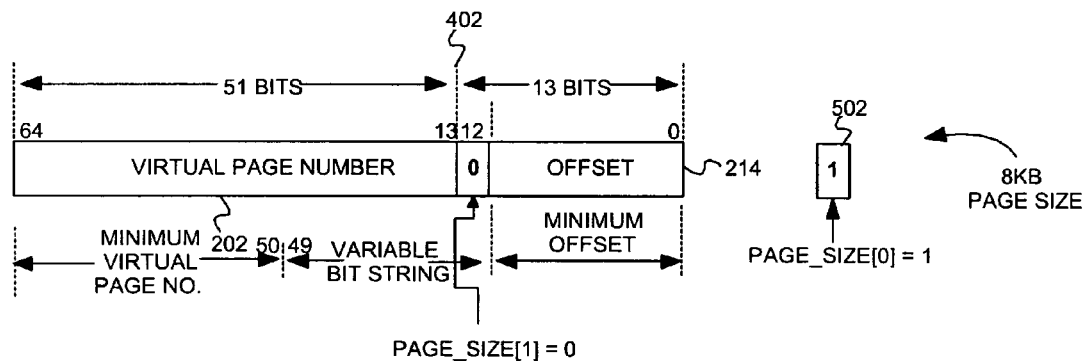
FIG. 5B is a block diagram illustrating virtual memory address fields and a 2-bit bit vector for encoding a page size within a virtual address, according to embodiments of the invention.
Figure 5C:
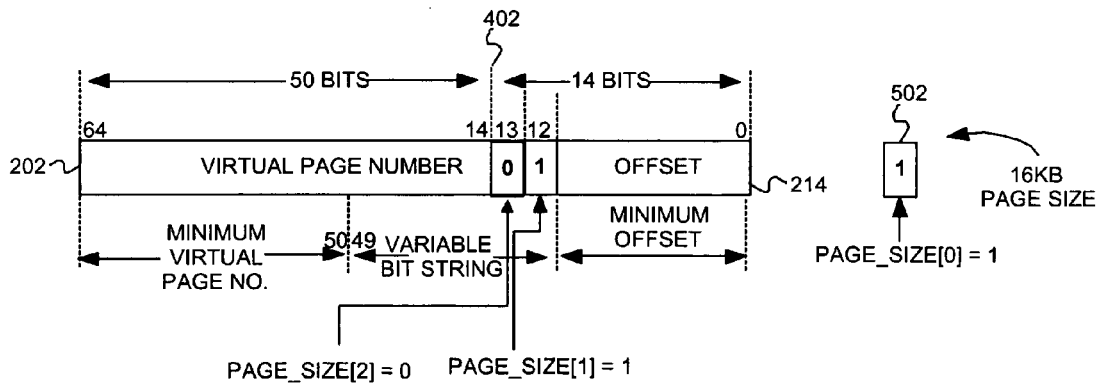
FIG. 5C is a block diagram illustrating a variable offset field boundary and 3-bit bit vector used for storing a page size, according to embodiments of the invention.
Figure 6:
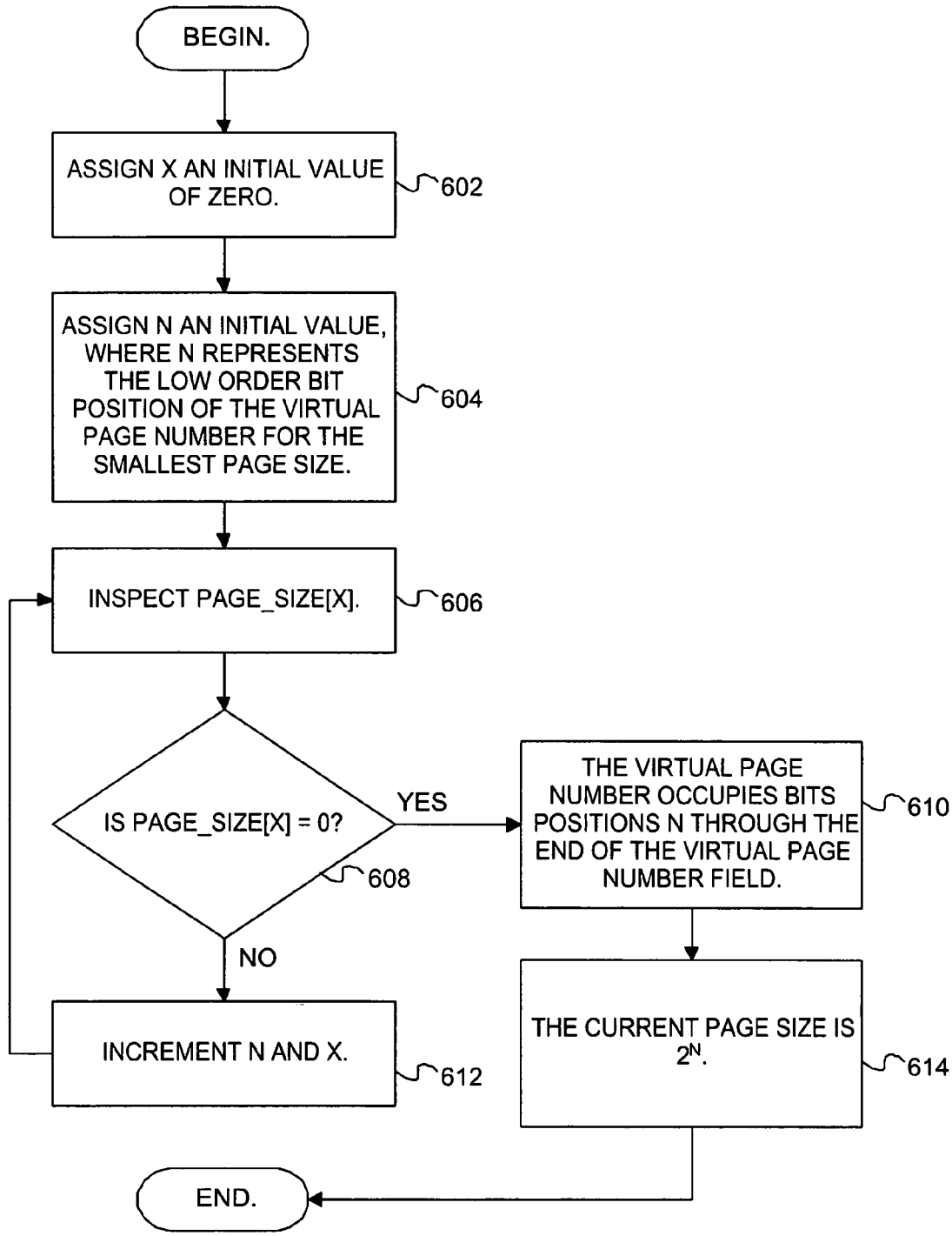
FIG. 6 is a flow diagram illustrating operations for encoding a page size within a virtual address, according to embodiments of the invention.

While FIGS. 4A and 4B describe the fields of a virtual address, FIGS. 5A–5C describe a technique for encoding a page size within a virtual address using an additional 1-bit memory location. FIG. 6 is a flow diagram describing operations for performing the encoding technique described in FIGS. 5A–5C.

FIG. 5A is a block diagram illustrating virtual memory address fields and a 1-bit bit vector for encoding a page size within a virtual address, according to embodiments of the invention. As shown in FIG. 5A, the memory location 502 stores the first element of a bit vector, which indicates the page size of a virtual address. In one embodiment, the memory location 502 is a one-bit memory location. According to alternative embodiments, the memory location 502 is larger than one bit. As shown in FIG. 5A, the minimum offset occupies bits 0–11, the variable bit string occupies bits 12–49, and the minimum page size occupies bits 50–64. The bit vector, referred to as Page_Size, includes a variable number of bits depending on the number of supported page sizes. More specifically, Page_Size includes anywhere from 0 to Max-1 bits, where $2^{Max}$ is the number of supported page sizes. As shown in FIG. 5A, when Page_Size [0]=0, the offset 214 spans 12 bits (e.g., bit positions 0 through 11) and the virtual page number 202 spans 52 bits, supporting a 4 Kb maximum page size. However, if Page_Size [0]=1, the boundary 402 moves to support a larger page size, as described below with reference to FIG. 5B.

FIG. 5B is a block diagram illustrating virtual memory address fields and a 2-bit bit vector for encoding a page size within a virtual address, according to embodiments of the invention. As shown in FIG. 5B, the minimum offset occupies bits 0–11, the variable bit string occupies bits 12–49, and the minimum page size occupies bits 50–64. Continuing from the discussion above, when Page_Size[0]=1, bit 12 and possibly more bits of the variable bit string will be used as part of the offset 214. Bit 12 is inspected to determine whether more bits are needed for the offset 214. As shown in FIG. 5B, bit 12 of the virtual address is zero, which means no more bits are needed. Because bit 12 is zero, the offset 218 occupies 13 bits of the virtual address, including bits 0 through 12. The 13-bit offset supports an 8 Kb page size. As noted above, the first bit of Page_Size is stored in the location 502 and the next bit (i.e., Page_Size[1]) is stored in bit 12 of the variable bit string of the virtual address. Any additional bits of Page_Size are also stored in the virtual address, as described below with reference to FIG. 5C.

FIG. 5C is a block diagram illustrating a variable offset field boundary and 3-bit bit vector used for storing a page size, according to embodiments of the invention. Building on the discussion above, when Page_Size[0]=1 and Page_Size[1]=1, bit 13 and possibly more bits of the variable bit string will be used as part of the offset 214. Bit 13 is inspected to determine whether more bits are needed for the offset 214. As shown in FIG. 5B, bit 13 of the virtual address is zero, which means no more bits are needed. Because bit 13 is zero, the offset 218 occupies 14 bits of the virtual address, including bits 0 through 13. The 14-bit offset supports a maximum page size of 16 Kb. As noted above, the first bit of Page_Size is stored in the location 502 and the next bits (i.e., Page_Size[1] and Page_Size[2]) are stored in bits 12 and 13 of the variable bit string of the virtual address. As the page size grows, the additional bits used for representing the page size are also stored in the variable bit string of the virtual address (e.g., Page_Size[3], Page_Size[4], . . . Page_Size[Max−1] are stored in the variable bit string of the virtual address).

FIG. 6 is a flow diagram illustrating operations for encoding a page size within a virtual address, according to embodiments of the invention. The flow diagram 600 commences a block 602, where a variable 'X' is assigned an initial value of zero. The process continues at block 604. At block 604, a variable 'N' is assigned an initial value, where N represents a low-order bit position of a virtual page number for the smallest supported page size. The process continues at block 606. At block 606, a bit vector Page_Size is inspected. The process continues at block 608.

At block 608, it is determined whether Page_Size[x]=0. If Page_Size [x]=0, the process continues at block 610. Otherwise, the process continues at block 612. At block 610, the size of the virtual page number is known because the virtual page number occupies bit positions N to the end of the virtual page number field. For example, the virtual page number can occupy bit positions N to 64, for a 64-bit virtual address. Alternative embodiments support larger or smaller virtual addresses. The process continues at block 614. At block 614, it is current page size is equal to $2^N$. For example, the current page size can be 4 Kb, 8 Kb, 16 Kb, etc. From block 614, the process ends. At block 612, the variables N and x are incremented. From block 612, the process continues at block 606.

Figure 7:
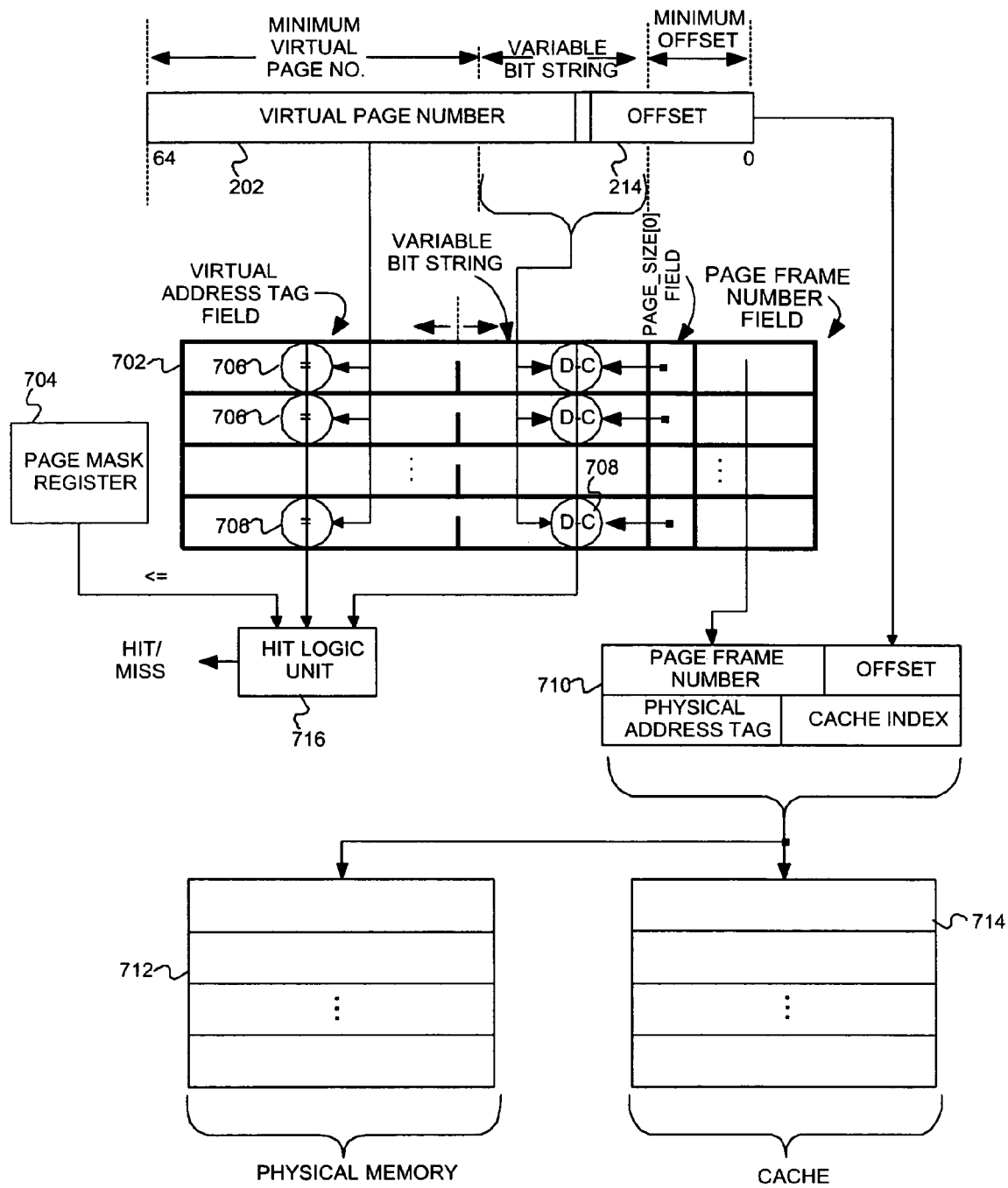
FIG. 7 as a block diagram illustrating logic for matching fixed and variable portions of a virtual address, according to embodiments of the invention.
Figure 8:
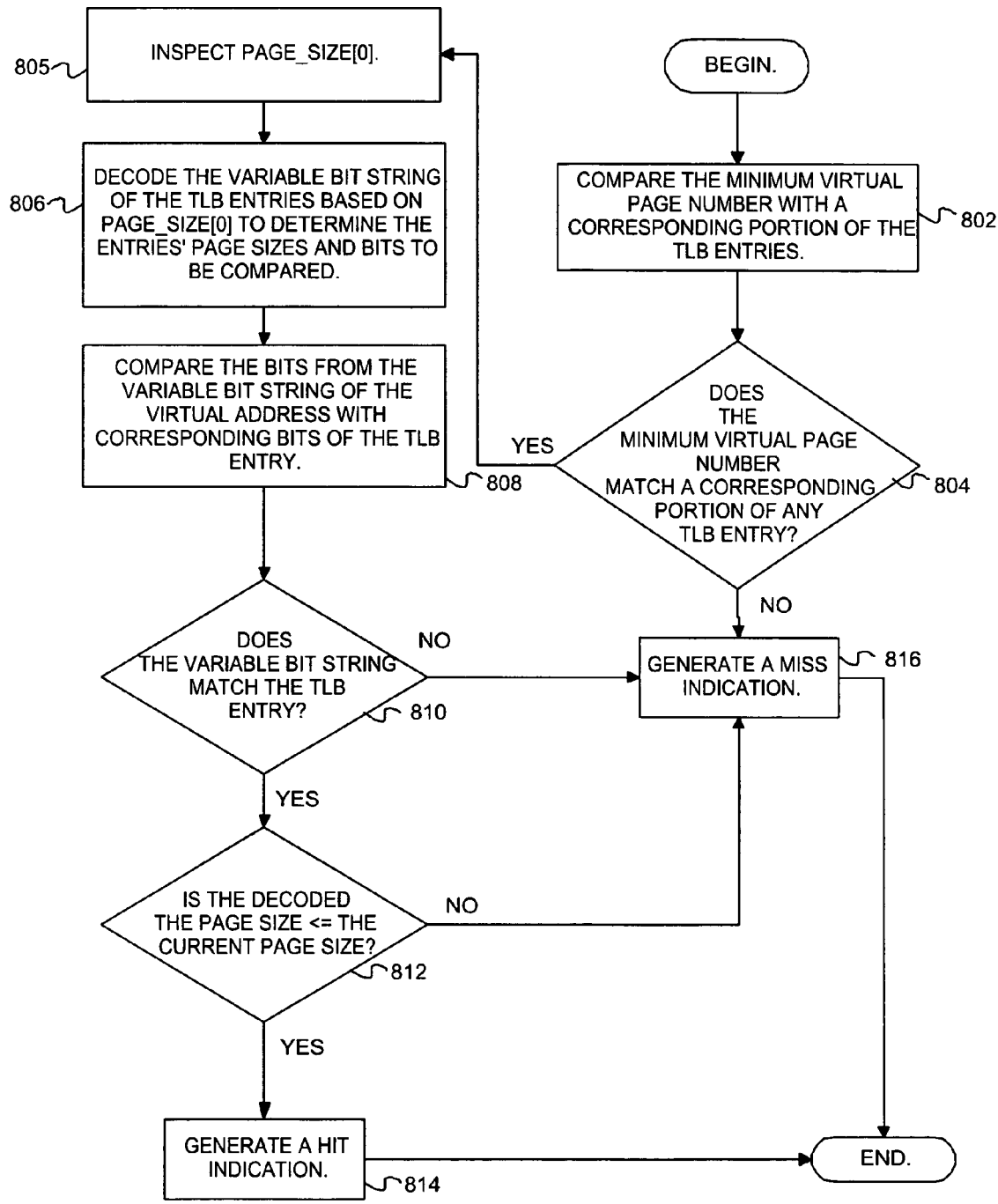
FIG. 8 is a flow diagram illustrating operations for matching fixed and variable portions of a virtual address, according to embodiments of the invention.

While FIGS. 5–6 describe a technique for encoding a page size in a virtual address, FIGS. 7 and 8 describe logic and operations for resolving virtual addresses that include encoded page sizes.

FIG. 7 as a block diagram illustrating logic for matching a virtual address with entries in a TLB, according to embodiments of the invention. As shown in FIG. 7, includes a virtual address, which includes a virtual page number 202 and offset 214. As described above, the virtual address includes a fixed portion and a variable portion. The fixed portion, which is part of the virtual page number 202, is transmitted to a TLB 702 for comparison with corresponding portions of the TLB entries. The TLB entries include fields for a page frame number, Page_Size [0], and virtual address tag. As noted above, in one embodiment, the Page_Size[0] field is a one-bit field. The TLB includes a comparator 706 and decoder-comparator 708 (illustrated as D-C 708) for each entry. Each decoder-comparator 708 is connected to the Page_Size [0] field for the same TLB entry. The comparators 706 and decoder-comparators 708 are connected with a hit logic unit 716. A page mask register 704 is also connected to the hit logic unit 716. The page frame number fields of the TLB 702 are connected to a predetermined location 710. In one embodiment, the predetermined location 710 is a load/store unit. Addresses are transmitted from the predetermined location to a cache 714 and/or a physical memory 712.

FIG. 8 is a flow diagram illustrating operations for matching fixed and variable portions of a virtual address, according to embodiments of the invention. The flow diagram 800 will be described with reference to the exemplary logic shown in FIG. 7. The flow diagram 800 commences at block 802. At block 802, the minimum virtual page number of the virtual memory address is compared with a corresponding portion of the TLB entries. For example, the TLB 702 receives the virtual address and the comparators 706 compare the minimum virtual page number (e.g., bits 50–64) with corresponding portions stored in the TLB entries. The process continues at block 804.

At block 804, it is determined whether the minimum virtual page number of the virtual address matches a corresponding portion of any of the TLB entries. If the minimum virtual page number matches a corresponding portion of a TLB entry, the process continues at block 805. Otherwise, the process continues at block 814.

At block 805, Page_Size[0] fields are inspected. For example, a decoder-comparitor 708 inspects the Page_Size [0] fields associated with matching TLB entries. The process continues at block 806.

As shown in block 806, the variable bit strings of the matching TLB entries are decoded to determine the page size and the bits to be compared. For example, the decoder-comparators 708 decode the variable portions of the TLB entries to determine page sizes and bits to compare. In one embodiment, the decoder-comparators 708 decode the TLB entries according to the technique described in FIGS. 5–6. After decoding the TLB entries, the decoder-comparators 708 compare the variable bit string of the TLB entries with corresponding portions of the virtual address. For example, if the smallest supported page size is 4 Kb (i.e., the minimum offset occupies bits 0–11) and the minimum virtual page number occupies bits 50–64, the variable bit string will occupy bits 11–50. If a decoder-comparator 708 decodes a TLB entry and determines that its page size is 16 Kb (see discussion of FIG. 5A–5C above), the TLB entry's offset 214 occupies bit positions 0 through 13, so the decoder-comparator 708 will compare bits 14–49 with corresponding bits of the TLB entry (see process block 808). The process continues at block 808.

At block 808, the bits from the variable bit string of the TLB entries are compared to corresponding bits of the virtual address. For example, the comparator-decoders 708 compare bits of the TLB entries (determined above at block 806) with the relevant bits of the variable bit string (e.g., bits 14–49, as described above). The process continues at block 810.

As shown in block 810, it is determined whether bits of the variable bit string match corresponding bits of a TLB. If there is a match, the process continues at block 812. Otherwise, the process continues at block 814.

At block 812, it is determined whether the decoded page size of the matching TLB entry is less than or equal to the current page size. For example, the hit logic 716 receives input from the page mask register 704 and the decoder-comparator 708 indicating the current page size and the decoded page size, respectively. The hit logic compares the current page size with the decoded page size. If the decoded page size is less than or equal to the current page size, the process continues at block 816. Otherwise, the process continues at block 814.

As shown in block 816, a hit indication is generated. For example, the hit logic unit 716 generates a hit indication. From block 816, the process ends.

At block 814, a miss indication is generated. For example, the hit logic unit 716 generates a miss indication. From block 814, the process ends.

Thus, a system and method for encoding page size information has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

We claim:

1. A method comprising:
   determining whether a virtual address is stored in a translation lookaside buffer (TLB), the TLB including a plurality of entries, wherein the entries include a minimum virtual page size bit string and a variable bit string, the determining including,
   comparing a first bit string of the virtual address to the minimum virtual page size bit string of each of the entries;
   determining whether the first bit string matches the minimum virtual page size bit string of one of the entries;
   if the first bit string matches the minimum virtual page number bit string of one of the entries, decoding a page size stored in the variable bit string of the matching entry and a data field associated with the matching entry, wherein the decoding determines a set of bits in the variable bit string; and
   comparing the set of bits of the variable bit string of the matching entry to a second bit string of the virtual address.

2. The method of claim 1 further comprising:
   if the set of bits matches the second bit string, generating a hit indication; and
   if the set of bits does not match the second bit string, generating a miss indication.

3. The method of claim 1, where the TLB is a fully associative TLB.

4. The method of claim 1, wherein a page size is encoded in the second bit string.

5. The method of claim 1, wherein the TLB is a second level TLB.

6. A method comprising:
    determining a page size encoded in a virtual address tag, wherein the virtual address tag is stored in a translation lookaside buffer entry, and wherein the virtual address tag includes a set of bits, wherein each bit of the set indicates whether an additional bit is needed to represent the page size, the determining including,
    inspecting a first bit stored in a 1-bit field of the TLB;
    determining whether the first bit indicates that at least another bit is needed to represent the page size;
    if at least another bit is needed to represent the page size, repeatedly inspecting successive bits of the set until a bit of the set indicates that an additional bit is not needed to represent the page size, and determining the page size based on the number of bits inspected.

7. The method of claim 6, wherein the TLB is a fully associative TLB.

8. The method of claim 6, wherein the page size ranges from 4 Kb to 4 Tb.

9. The method of claim 6, wherein the TLB is a second level TLB.

10. The method of claim 6, wherein the page size is represented by a 4-bit string.

11. An apparatus comprising:
    a translation lookaside buffer (TLB) to receive a virtual address, wherein the TLB includes a plurality of entries, wherein each of the plurality of entries includes a minimum virtual page size bit string, a variable bit string, and a 1-data field, the translation lookaside buffer including,
    a first set of comparators to compare a first bit string of the virtual address to the minimum virtual page size bit string of each of the plurality of entries;
    a second set of decoder-comparators to decode a page size encoded in the variable bit string and the data field of each entry, and to compare a portion of the variable bit string to a second bit string of the virtual address, wherein the portion is based on the page size.

12. The apparatus of claim 11 further comprising:
    a page mask register to provide a current page size;
    a hit logic unit coupled to the page mask register, the first set of comparators, and the second set of decoder-comparators, the hit logic to determine whether the current page size is less than or equal to the page size.

13. The apparatus of claim 11, wherein the hit logic generates a miss indication after determining that a current page size is less than the page size.

14. The apparatus of claim 11, wherein the TLB is a fully associative TLB.

15. The apparatus of claim 11, wherein the TLB is a second level TLB.

16. An apparatus comprising:
    a translation lookaside buffer (TLB) including a plurality of entries, wherein each of the entries includes,
    a virtual address tag field;
    a variable bit string to store an encoded page size;
    a 1-bit field to store information used in decoding the encoded page size; and
    a page frame number field;
    the TLB also including,
    a set of decoder-comparators, wherein one of the set of decoder-comparators is associated with each of the entries, and wherein the decoder-comparators decode the encoded page size stored in the variable bit string, and wherein the decoder-comparators compare a part of the variable bit string with a part of a virtual page number.

17. The apparatus of claim 16, wherein the TLB is fully associative.

18. The apparatus of claim 16, wherein the TLB is a second level TLB.

19. The apparatus of claim 16 further comprising:
    a page mask register to provide a current page size;
    a hit logic unit coupled to the TLB and the page mask register, the hit logic unit to determine whether the current page size is less than or equal to the decoded page size.

20. The apparatus of claim 16, wherein the hit logic generates a miss indication after determining a current page size is less than the decoded page size.

* * * * *

UNITED STATES PATENT AND TRADEMARK OFFICE
CERTIFICATE OF CORRECTION

PATENT NO.       : 7,100,018 B2                                              Page 1 of 1
APPLICATION NO.  : 10/632681
DATED            : August 29, 2006
INVENTOR(S)      : Zhang et al.

It is certified that error appears in the above-identified patent and that said Letters Patent is hereby corrected as shown below:

On the face page, in field (73), in "Assignee", in column 1, line 2, after "CA" insert -- 94043 --.

On the face page, in "Assistant Examiner", in column 2, line 1, delete "Daniel Ko" and insert -- Daniel B. Ko --, therefor.

On Sheet 2 of 8, in FIG. 2 (Above Block 216), line 1, delete "PHYISCAL" and insert -- PHYSICAL --, therefor.

In column 1, line 3, below "INFORMATION" insert -- LIMITED COPYRIGHT WAIVER --.

In column 5, line 1, delete "(Page Size)" and insert -- (Page_Size) --, therefor.

In column 7, line 43, delete "decoder-comparitor" and insert -- decoder-comparator --, therefor.

In column 7, line 61, delete "FIG." and insert -- FIGS. --, therefor.

In column 8, line 62, in Claim 3, delete "where" and insert -- wherein --, therefor.

In column 9, line 33, in Claim 11, delete "1-data" and insert -- data --, therefor.

Signed and Sealed this

Second Day of January, 2007

JON W. DUDAS
*Director of the United States Patent and Trademark Office*